March 30, 1937.    W. L. CHURCH    2,075,427

PIPE JOINT

Filed Dec. 28, 1936

Inventor
Walter L. Church

By
Edward V. Hardway
Attorney

Patented Mar. 30, 1937

2,075,427

UNITED STATES PATENT OFFICE 2,075,427

PIPE JOINT

Walter L. Church, Houston, Tex., assignor of one-half to W. L. Pearce, Harris County, Tex.

Application December 28, 1936, Serial No. 117,745

5 Claims. (Cl. 285—146)

This invention relates to a pipe joint and has particular relation to novel means for connecting pipe sections, or rod sections together whereby they may be easily separated.

The invention embodies certain improvements over that type of connection disclosed in my co-pending application for Pipe holder, Serial No. 713,487, filed in the United States Patent Office on the 1st day of March, 1934.

An object of the invention is to provide a connection for pipes or rods, one of the connected sections having teeth, or projections formed of very hard material and the other section having a shoulder arranged opposite the teeth and formed of softer material to the end that when the sections are screwed together the teeth, or projections will bite into the softer material to prevent the threaded parts from becoming too tightly screwed together whereby the threads may be readily separated.

It is another object to provide, in a pipe coupling, or connection means for forming a fluid tight joint whereby a gritty fluid being forced under pressure through the pipe will be excluded from the threads connecting the pipe sections.

With the above and other objects in view the invention has particular relation to certain novel features of construction, arrangement of parts and use, an example of which is given in this specification and illustrated in the accompanying drawing, wherein:—

Figure 1:
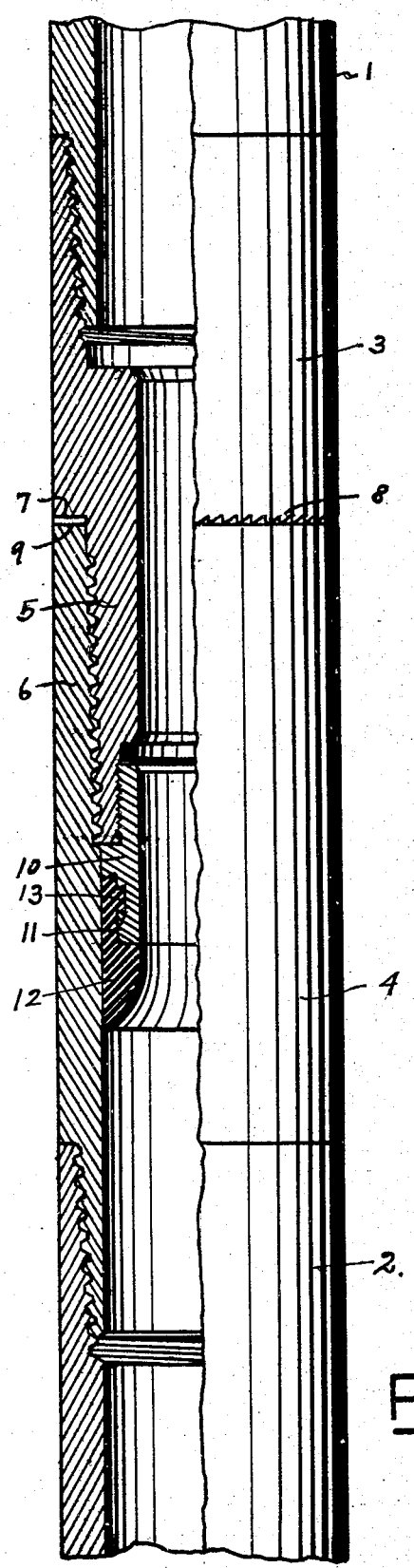
Figure 1 shows a side elevation, partly in section, showing the connection.

In the drawing the numerals 1 and 2 designate sections of pipe to be connected. As shown these sections are connected by the pin and box tool joint members 3 and 4. The pin member 3 has a reduced outwardly threaded pin 5 and the box member 4 has an internally threaded box 6 into which the pin is adapted to be screwed. The section 1 is connected by threads to the pin member and the section 2 is connected by threads to the box member.

Figure 2:
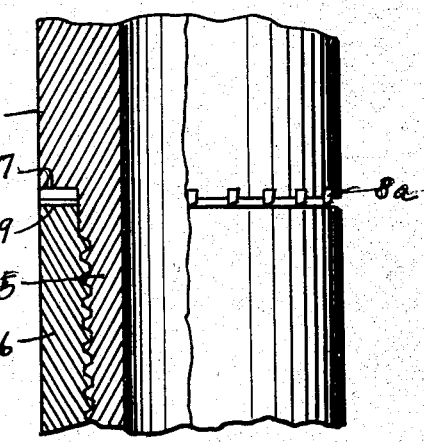
Figure 2 shows a fragmentary side elevation, partly in section, showing a modified form thereof.

An external shoulder 7 is formed on the pin member by the reduction of the pin 5 thereof and this shoulder is provided with the teeth 8 formed of very hard material. When the pin 5 is screwed home into the box the teeth 8 will bite into the softer material of the opposing end 9 of the box 6 whereby the screw threads connecting the members are prevented from becoming screwed up too tight so that the joint may be readily broken. If desired the teeth 8a may be inserted into the shoulder 7 of the pin member 3 as shown in Figure 2. In other respects the form shown in Figure 2 is the same as that shown in Figure 1.

Screwed into the end of the pin 5 there is an anchor 10 which is tubular in form and projects beyond the pin 5. This projecting end is reduced in outside diameter and is provided with an external annular dove tailed groove 11 and a resilient packing member 12, preferably formed of rubber, is fitted around the projecting end of the anchor 10 and has a dove tailed rib 13 which fits into the groove 11 to anchor the packing 12 in place. The packing ring 12 has an outside diameter to fit closely within the box member 4 and is flared outwardly as shown so as to form a close fit with the box member to prevent any gritty substances contained in the fluid passing through the pipe from reaching the connecting threads.

The drawing and description disclose what are now considered to be preferred forms of the invention, by way of illustration only while the broad principle of the invention will be defined by the appended claims.

What I claim is:—

1. A pipe joint composed of two sections connected by threads, one of said sections having a projection formed of hard material and the abutting part of the other section being formed of relatively soft material into which said projection bites when the sections are screwed fully together.

2. A pipe joint composed of two sections one having a reduced outwardly threaded pin and an external annular shoulder and the other section having an internally threaded box to receive the pin, said shoulder and the opposing part of the box being formed, one of relatively soft material and the other with hardened teeth adapted to penetrate into said material when the sections are screwed together.

3. A pipe joint comprising two tubular sections connected by threads and having abutting parts, one of said abutting parts being formed of relatively soft material and the other of said abutting parts having teeth formed of hard material and adapted to penetrate the softer material when the sections are screwed together.

4. A pipe joint comprising two tubular sections, one formed with an outwardly threaded pin and the other being formed with an internally threaded box to receive the pin, said sections having abutting parts, one of said parts being formed of relatively soft material and the other of said parts having hardened teeth adapted to penetrate the softer material when the parts are screwed together, an annular packing member formed of resilient material carried by the pin and shaped to fit tightly in the box member when the pin is screwed into the box.

5. A joint comprising two sections, one formed with an outwardly threaded pin and the other being formed with an internally threaded box to receive the pin, said sections having opposing parts one of said parts being formed of relatively soft material and the other of said parts having inserted teeth formed of hard material adapted to penetrate the soft material when the parts are screwed together.

WALTER L. CHURCH.